(12) United States Patent
Corbin et al.

(10) Patent No.: US 7,334,996 B2
(45) Date of Patent: Feb. 26, 2008

(54) DEVICE FOR THE POSITIONING OF A BLADE AND BLADED DISK COMPRISING SUCH A DEVICE

(75) Inventors: Claude Corbin, Voisenon (FR); Eric Lefebvre, Moissy Cramayel (FR)

(73) Assignee: SNECMA, Paris (FR)

( * ) Notice: Subject to any disclaimer, the term of this patent is extended or adjusted under 35 U.S.C. 154(b) by 10 days.

(21) Appl. No.: 11/340,644

(22) Filed: Jan. 27, 2006

(65) Prior Publication Data
US 2006/0165530 A1 Jul. 27, 2006

(30) Foreign Application Priority Data
Jan. 27, 2005 (FR) .................... 05 00837

(51) Int. Cl.
*F01D 5/32* (2006.01)
(52) U.S. Cl. ..................................... 416/221
(58) Field of Classification Search ............ 416/220 R, 416/221, 248, 500
See application file for complete search history.

(56) References Cited

U.S. PATENT DOCUMENTS

| 3,572,970 A | 3/1971 | Smuland |
| 4,022,545 A | 5/1977 | Shank |
| 5,123,813 A | 6/1992 | Przytulski et al. |
| 5,282,720 A * | 2/1994 | Szpunar .................. 416/220 R |
| 5,622,476 A * | 4/1997 | Adde et al. .................. 416/221 |
| 5,820,347 A * | 10/1998 | Bussonnet et al. .......... 416/221 |
| 6,287,664 B1 * | 9/2001 | Pratt ........................... 428/68 |
| 6,761,538 B2 * | 7/2004 | Fitts et al. .................. 416/221 |
| 7,198,463 B2 * | 4/2007 | Kanebako et al. .......... 415/175 |

FOREIGN PATENT DOCUMENTS

| DE | 32 36 021 A1 | 5/1983 |
| FR | 2 841 609 | 1/2004 |
| GB | 2 262 139 A | 6/1993 |
| JP | 57 122102 | 7/1982 |
| JP | 10 2999407 | 11/1998 |

* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A device for the positioning of a blade in a slot of a rotor disk includes a spring spacer that consists of a single elastic piece of profiled shape with a top wall and a bottom wall connected together by two side walls. The two side walls include at least one machined feature.

21 Claims, 3 Drawing Sheets

DEVICE FOR THE POSITIONING OF A BLADE AND BLADED DISK COMPRISING SUCH A DEVICE

BACKGROUND OF THE INVENTION

1. Field of the Invention

The invention relates to a device for the positioning of the root of the blades of a turbojet, for example the fan blades. It relates more precisely to a spacer intended to correctly position the root of the blades in their housing, provided on the periphery of a rotor disk.

2. Discussion of the Background

In a turbojet, the blades, consisting of a root and an airfoil defined by two sides called the pressure face and the suction face respectively, are mounted in groove-shaped housings, called slots, provided especially on the periphery of the rotor disks. These slots may be straight or curved. The blades are mounted with a clearance between their root and the walls of the slots. For the turbojet to operate correctly, the blade roots and the slots of the disk must be in contact over the entire rotation speed range of the engine. The surfaces of contact between the blade roots and the slots are called bearing surfaces. The clearance between the bottom of the slots and the end of the blade roots must be taken up in order to ensure the correct positioning of the blade roots on the bearing surfaces of the disk. In addition, this contact makes it possible to limit the tilting of the blades in their slots and, in certain cases of malfunction, for example in the event of an impact following the ingestion of a foreign body or in the event of the loss of a blade, also to limit the risk of frictional wear or other possible deterioration of the bearing surfaces of the blades or of the disk.

In a known manner, the blades are positioned and kept in place by spacers slid into the slots under each blade root.

In the case of the loss of a blade, the broken blade will impact the adjacent blade, which must be able to tilt about its root in order to release an angle at its tip so that the broken blade slides between the tip of the adjacent blade and the casing situated around the assembly consisting of the rotor disk and the blades. The spacers must therefore, under the effect of the high force resulting from the impact of the broken blade on the adjacent blade, allow the latter to pivot in the slot of the disk. This pivoting must also be controlled in the event of an impact associated with the ingestion of a foreign body by the turbojet, whether or not there is breakage of a blade.

Patent FR 2 841 609 describes a bi-material spacer, consisting of a metal part and an elastomer part. This type of spacer makes it possible to take up the clearance existing between the blade roots and the bearing surfaces of the slots. It also makes it possible to damp the vibrations and allows a slight rotation of the root in the slot in the case of breakage of an adjacent blade, while absorbing part of the impact energy. A first disadvantage of this solution is that installing the spacer under the blade root and dismantling it are difficult because of the coefficient of adhesion of the elastomers. Furthermore, over time, elastomers tend to shrink, which degrades the quality of take-up of the clearance between the blade roots and the bearing surfaces of the slots and increases in the risk of frictional wear of the bearing surfaces of the blades and of the disk.

SUMMARY OF THE INVENTION

The object of the invention is to alleviate the disadvantages of the current solutions and produce a device for the positioning of the blade root of a turbojet allowing effective take-up of the clearance between the disk and the blade root irrespective of the rotation speed of the rotor, irrespective of the operating situation, that is to say even in the event, for example, of the loss of a blade, and to do this so that it lasts over time.

For this, the invention relates to a spring spacer device, of profiled shape, that can in particular be made of a composite. "Profiled" means a shape originating from a basic shape of constant cross section over its entire length. This profiled spacer makes it possible, thanks to a single elastic piece, to correctly position the blade roots in the slots and to keep them in place irrespective of the rotation speed of the rotor. This device also allows the blade root to tilt in the case of a malfunction, for example in the event of an impact or the loss of a blade, and ensures that the impacted blade returns to the initial position.

According to the invention, the device for the positioning of a blade in a slot of a rotor disk comprises a spring spacer consisting of a single elastic piece of profiled shape.

Advantageously, the profiled shape of the spacer is hollow. However, it may also contain a core in its central part.

According to the invention, the spacer may comprise machined features on its side parts.

Preferably, said spacer comprises at its upstream and downstream ends respectively a polarizing key and a tab.

According to an additional feature of the invention, said spacer is made from a single material. Advantageously, it is made from a composite. This composite may consist of fibers of identical material or different materials and may be made from a prepreg lay-up part or from a structure made of woven fibers. But the spacer may also be made from a metal material.

Alternatively, the polarizing key and the tab are made of a different material from that of said spacer.

The polarizing key and the tab may form a single piece with said spacer or be fitted and fixed to the spacer.

The invention also relates to a bladed disk comprising a disk, at least one blade in a slot made on the periphery of the disk and at least one device for the positioning of the blade in its slot.

BRIEF DESCRIPTION OF THE DRAWINGS

Other features or advantages of the invention will become clearly apparent in the rest of the description given as a nonlimiting example and made with reference to the appended figures which represent.

DESCRIPTION OF THE PREFERRED EMBODIMENTS

Figure 1:
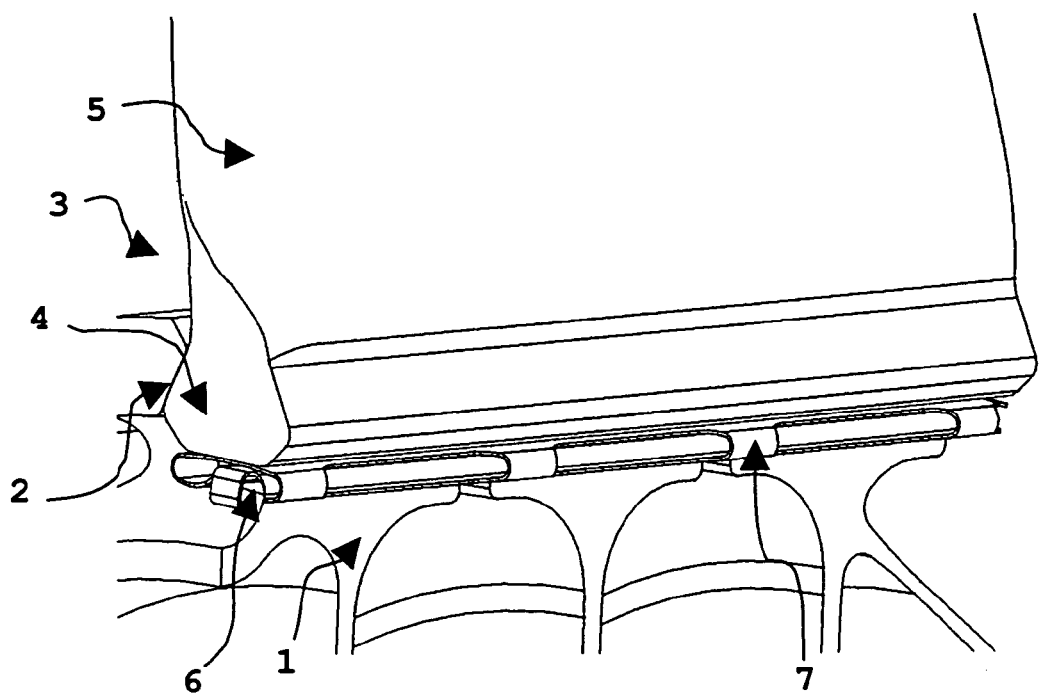
FIG. 1, a perspective view of a spacer according to the invention in place in a disk slot, under a blade root.

FIG. 1 shows a disk 1 of a rotor, for example a fan rotor, on the periphery of which slots 2 are provided. These slots 2 may be straight, curved or of any other shape. In the example given here, the slots are straight and have a dovetail cross section.

Housed in each slot 2 is a blade 3, comprising a root 4 and an aerodynamic airfoil 5. The root 4 of the blade 3, here of dovetail shape, is inserted axially into the corresponding slot 2.

Figure 2:
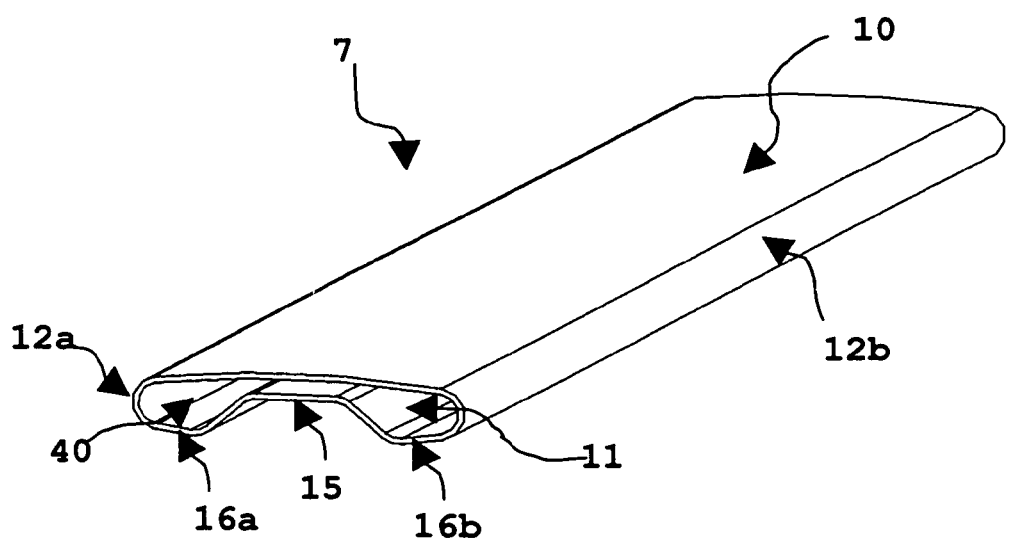
FIG. 2: a perspective view of a spacer according to a first embodiment of the invention.
Figure 3:
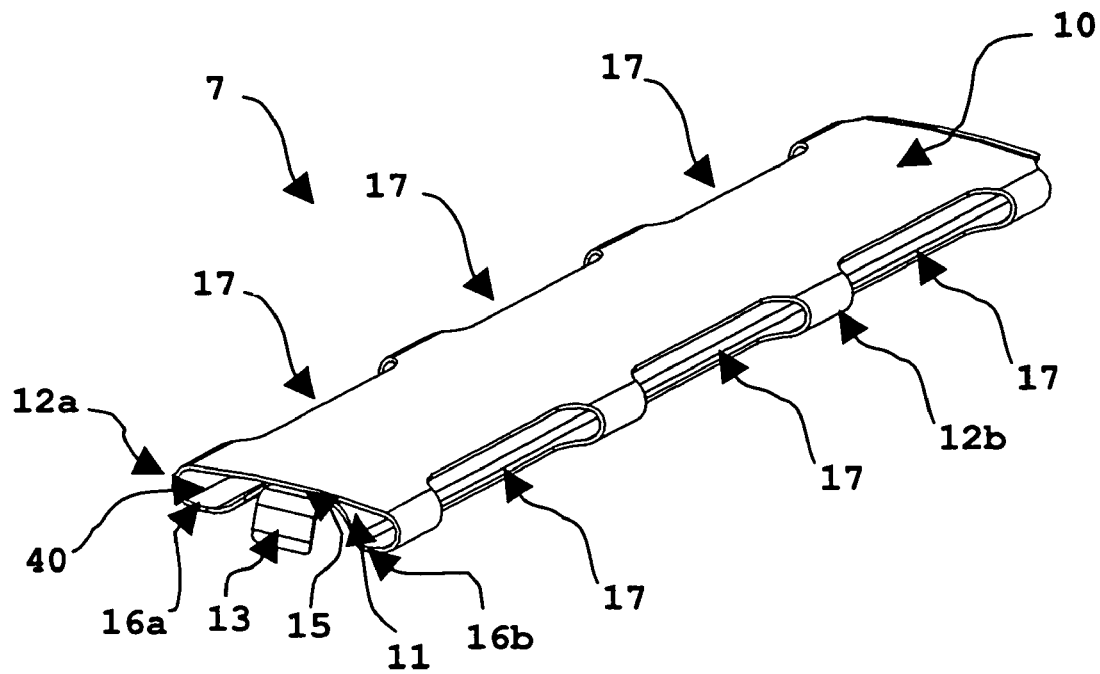
FIG. 3: a perspective view of a spacer according to a second embodiment of the invention.
Figure 4:
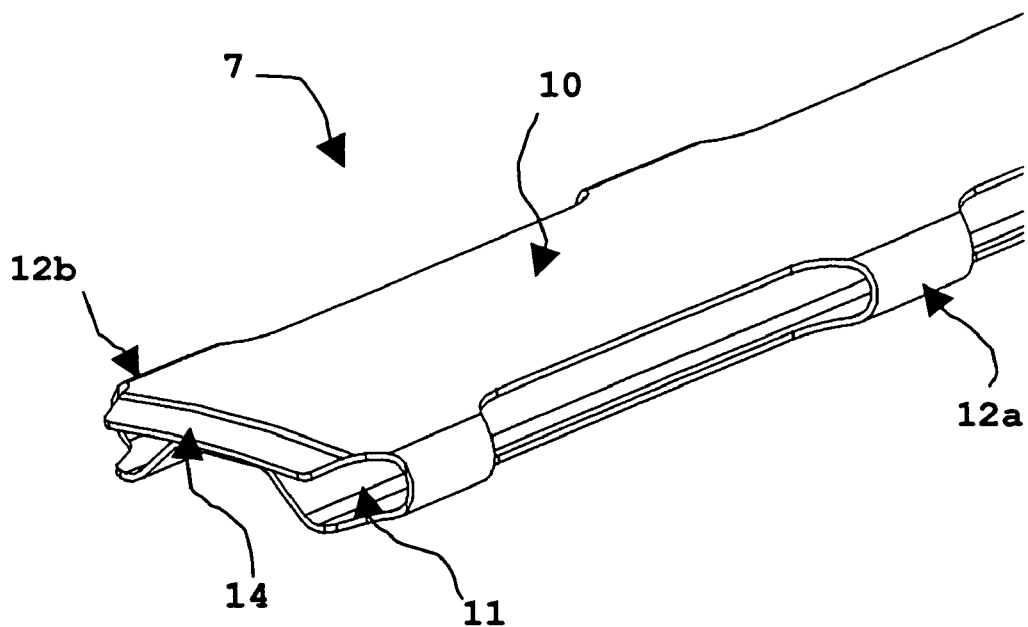
FIG. 4: a perspective view of the downstream part of a spacer according to the second embodiment of the invention.

Slid between the root 4 of the blade 3 and the bottom 6 of the slot 2 is a spacer 7, shown in greater detail in FIGS. 2, 3 and 4. The spacer 7 is mounted axially from the upstream end to the downstream end of the disk 1, that is to say from left to right in FIG. 1.

Hereinafter the term top, respectively bottom, will mean radially outer, respectively inner.

The spacer 7, illustrated in FIGS. 2, 3 and 4, is a single piece, of hollow profiled shape. It comprises a top wall 10, a bottom wall 11 and two side walls 12a and 12b. The central part 40 of the profiled shape may, where necessary, contain a core (not shown), forming a whole with the spacer 7.

Preferably, the top wall 10 is slightly domed, the convex side being situated radially toward the outside, that is to say toward the root 4 of the blade 3, the concave side being situated radially toward the inside of the spacer 7. Its thickness may be constant or may vary along the axial and/or tangential directions. This top wall 10 is directly in contact with the bottom bearing surface of the root 4 of the blade 3.

The bottom wall 11 comprises a central zone 15 and two peripheral zones 16a and 16b. The peripheral zones 16a and 16b are in contact with the bottom 6 of the slot 2, the shape of which peripheral zones closely matches that of the bottom 6. The central part 15 is recessed toward the interior of the spacer 7, that is to say that the radial positions of the peripheral zones 16a and 16b, on the one hand, and of the central zone 15, on the other hand, are different, the central zone being further away from the axis of rotation of the disk 1. This disposition gives the whole spacer 7 flexibility and contributes to its spring effect. The respective thicknesses of the three zones comprising the bottom wall 11 may be constant or variable.

The general profile of the bottom wall 11, that is to say the relative positioning of the zones 15, 16a and 16b, is determined according to the overall flexibility desired for the spacer 7. In FIGS. 2, 3 and 4, this profile is ribbed, but, depending on the desired flexibility, it may be of another shape, and be for example similar to the profile of the top wall 10. Similarly, the thicknesses of the top wall 10 and the bottom wall 11 are determined and optimized according to the overall flexibility sought.

The two side walls 12a and 12b connect together the top wall 10 and the bottom wall 11 via a rounded shape. They may or may not be symmetrical, of identical and constant thicknesses over the whole length of the spacer or of different and variable thicknesses. Machined features 17, visible in FIGS. 3 and 4, may be made on the parts 12a and 12b. They make it possible to optimize the flexibility of the spacer and obtain a good compromise between flexibility, mechanical strength and mass. They make it possible to adjust the flexibility and the mechanical strength during the spacer optimization phase.

The top wall 10, bottom wall 11 and side walls 12a and 12b of the spacer 7 are preferably made of a composite and may be obtained, for example, using a prepreg lay-up technique. In this case, the walls are made from a stack of several plies of fabric, of any type of fiber, which are impregnated with organic resin and placed in a mold around a core. This assembly is then placed in an autoclave in order to undergo a curing cycle. Under the effect of the temperature and the pressure, the resin seeps into the fabric. The walls of the spacer may also be obtained from a preformed structure of woven fibers injected with resin by using a known method called the RTM (Resin Transfer Molding) method, as described in the patent FR 2759096. The fibers may be based on a single material or different materials, for example a blend of carbon fibers with glass fibers and Kevlar fibers The composite is formed around one or more cores which may be removed, in the case of silicone or soluble cores, or kept in place, in the case of foam cores. As shown in FIGS. 2, 3 and 4, the profiled shape of the spacer 7 is made so as to be able to be produced as simply as possible in this type of material. One advantage of composites is that they provide a very good compromise between flexibility and mechanical strength, particularly by juggling with the thicknesses, the shapes and the orientation of the fibers. Another advantage of this type of material is associated with their density, which is for example lower than that of a metal material, which makes it possible, with the same geometry, to obtain a lighter piece.

However, the top wall 10, bottom wall 11 and side walls 12a and 12b of the spacer 7 could also be obtained from a metal material, for example from a folded and welded metal sheet.

Provided upstream of the spacer 7, that is to say on the left in FIG. 1, is a kind of tab 13, called a polarizing key (or an orientation key), visible in FIG. 3. This polarizing key 13 has two functions. It makes it possible, during the installation of the spacer 7, to avoid an assembly error by preventing the spacer 7 being installed back to front, that is to say preventing either the upstream end of the spacer 7 being installed toward the downstream end of the disk 1, that is to say preventing the upstream end of the spacer 7 being positioned on the right in FIG. 1, or the top wall 10 of the spacer 7 being installed underneath, that is to say instead of the bottom wall 11. The polarizing key 13 also makes it easier to extract the spacer 7 during any dismantling operation.

Provided downstream of the spacer 7, that is to say on the right in FIG. 1, is a second tab 14, visible in FIG. 4. This tab 14 is situated in the extension of the top wall 10 of the spacer 7. It is slightly inclined, its free end being directed radially toward the inside of the spacer 7. Thanks to this incline, the tab 14 makes it easier to install the spacer 7 by guiding it between the root 4 of the blade 3 and the bottom 6 of the slot 2.

The polarizing key 13 and the tab 14 may be made of composite or metal material. They may form an integral part of the spacer 7 and thus form a single piece with it, or they may be fitted and be for example riveted, bonded, countersunk, welded or brazed.

Figure 5:
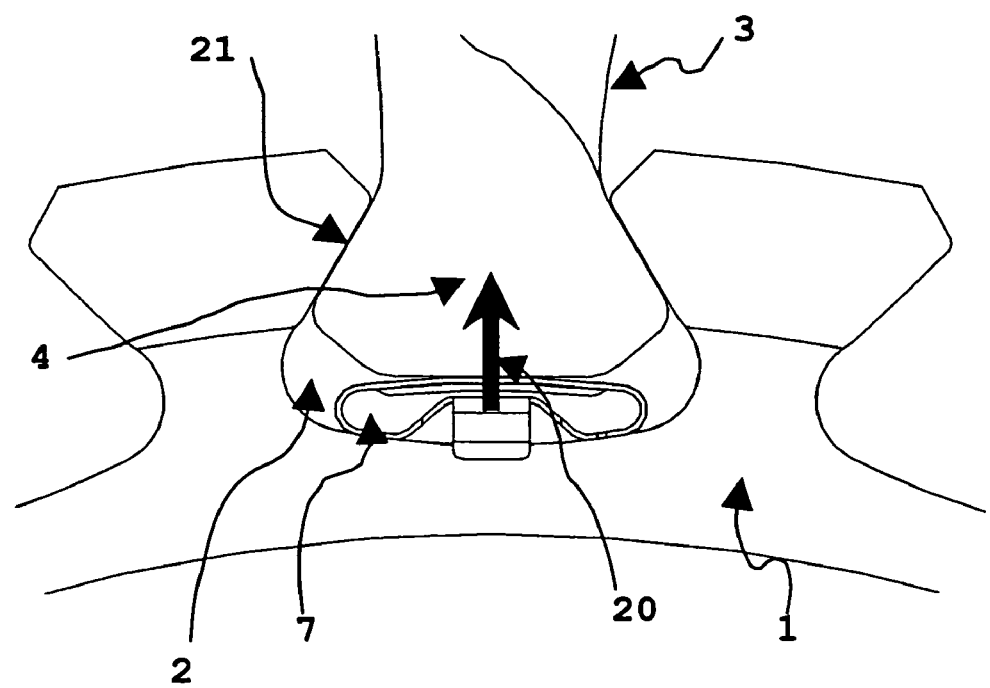
FIG. 5: a side view of a bladed disk fitted with a spacer according to the second embodiment of the invention.

During installation, the spacer 7 deforms. It flattens radially and is thus placed under stress between the bottom 6 of the slot 2 of the disk 1 and the root 4 of the blade 3. The deformation of the profile of the spacer 7 during installation generates a radial force, indicated in FIG. 5 by the arrow 20. This radial force, directed from the bottom of the slot 2 toward the periphery of the disk 1, presses the root 4 of the blade 3 against the surfaces 21 of the disk 1, called the bearing surfaces. Thus, the clearance existing between the root of the blade 3 and the bearing surfaces 21 of the disk 1 is taken up thanks to the spring effect of the spacer 7. This spring force associated with the fact that the material of the spacer does not deteriorate over time, unlike elastomers for example, ensures effective clearance take-up, even after several hours of rotation of the disk 1.

Unlike a rigid spacer requiring for its installation a clearance between the blade root, the disk and the spacer, and thanks to its behavior close to that of a spring, the spacer 7 as mentioned is always in contact with the bottom 6 of the slot 2 and the root 4 of the blade 3. In addition, thanks to the fitting prestress, it always hugs its housing, and the clearance between the blade root and the walls of the slot is always taken up. Furthermore, thanks to its spring effect, the spacer 7 constitutes an excellent vibration damper and thus prevents frictional wear at the surfaces in contact.

The hollow and optimized profiled shape of the spacer 7 furthermore makes it possible to save weight in particular compared with a bi-material spacer.

Figure 6:
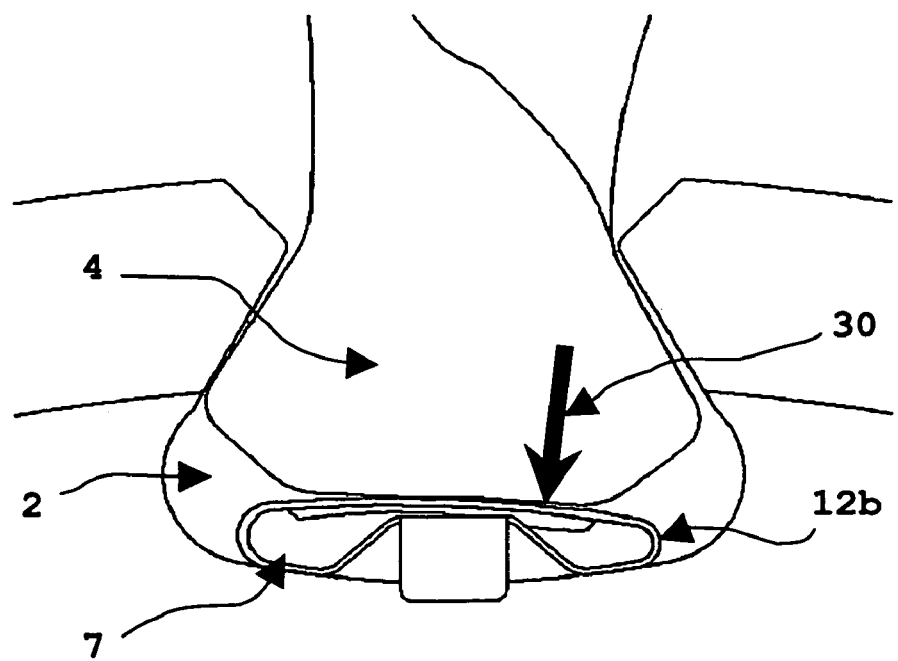
FIG. 6: a side view of a bladed disk fitted with a spacer according to the second embodiment of the invention, in place in a disk slot, under a blade root in the event of the blade tilting following a malfunction.

FIG. 6 illustrates the behavior of the spacer 7 in the event of the loss of a blade. When a blade of the disk 1 breaks, the broken blade will strike the blade next to it, called the adjacent blade. The force created by this impact is transmitted toward the root 4 of the adjacent blade 3 and to the spacer 7. The force on the spacer 7 resulting from the impact is indicated in FIG. 6 by the arrow 30. Under the effect of this force, that side of the spacer 7 to which it is applied, that is to say on the side wall 12b side, is compressed. Since the spacer 7 is flexible and operates like a spring, it deforms by collapsing on the side wall 12b side. This deformation absorbs part of the impact energy and allows the adjacent blade 3 to pivot in its slot as indicated in FIG. 6. Thus, a clearance is released at the tip of the adjacent blade 3, allowing the broken blade to slide between the tip of the blades and the casing (not shown) surrounding the rotor. Once the broken blade has slid between the top of the blade and the casing, no more force 30 is applied to the spacer 7. The latter, thanks to its elasticity and to the fitting prestress, returns to a position close to its initial position and makes it possible to reset the blade 3 in its slot 2, in a position close to its initial position. The deformation sustained by the spacer may be elastic or plastic. A localized breakage of the spacer 7, at the side wall 12b, may also be accepted, because the spacer 7 is dimensioned so as to ensure that the blade 3 returns to a position close to its initial position. The return of the adjacent blade 3 to a position close to its initial position allows, on the one hand, the engine to be able to continue its rotation while optimally minimizing the harmful effect of a loss of a blade on its operation, and prevents, on the other hand, the blade 3 from descending toward the bottom of the slot 2 and from coming out of its housing.

The invention claimed is:

1. A device for positioning a blade in a slot of a rotor disk, comprising a spring spacer,
   wherein the spacer is formed of a single elastic piece of profiled shape comprising a top wall and a bottom wall connected together by two side walls,
   wherein the two side walls include at least one machined feature (17), and
   wherein the bottom wall includes a central zone between two peripheral zones, and said central zone is recessed toward an interior of said spacer such that said central zone has a radial position that is different from that of said peripheral zones, said central zone being further away from an axis of rotation of said rotor disk.

2. The device for positioning a blade according to claim 1, wherein the profiled shape of the spacer is hollow.

3. The device for positioning a blade according to claim 1, wherein the profiled shape of the spacer contains a core in its central part.

4. The device for positioning a blade according to claim 1, further comprising a polarizing key at an upstream end of said spacer and a tab at a downstream end of said spacer.

5. The device for the positioning a blade according to claim 4, wherein the polarizing key and the tab are made from a material different from that of said spacer.

6. The device for positioning a blade according to claim 4, wherein the polarizing key and the tab form a one-part piece with said spacer.

7. The device for positioning blade according to claim 4, wherein the polarizing key and the tab are fitted and attached to said spacer.

8. The device for positioning a blade according to claim 1, wherein said spacer is produced from a single material.

9. The device for positioning a blade according to claim 1, wherein said spacer is made from a composite.

10. The device for positioning a blade according to claim 9, wherein the composite includes fibers of identical material.

11. The device for positioning a blade according to claim 9, wherein the composite includes fibers of different materials.

12. The device for positioning a blade according to claim 9, wherein the spacer is made from a prepreg lay-up.

13. The device for positioning a blade according to claim 9, wherein the spacer is made from a structure of woven fibers.

14. The device for positioning a blade according to claim 9, wherein said composite comprises fibers and an organic resin.

15. The device for positioning a blade according to claim 14, wherein said fibers include a blend of carbon fibers, glass fibers and Kevlar fibers.

16. The device for positioning a blade according to claim 1, wherein said spacer is made from a metal material.

17. A bladed disk comprising a disk, at least one blade in a slot made on the periphery of the disk and at least one device for positioning the blade in said slot, said device being according to claim 1.

18. A turbojet comprising at least one bladed disk according to claim 17.

19. The bladed disk according to claim 17, wherein when said blade is mounted in said slot, said device is under stress between a bottom of said slot and a root of said blade such that said device undergoes a deformation that generates a radial force pressing said root of said blade against bearing surfaces of said disk.

20. The bladed disk according to claim 17, wherein said device is maintained between said bottom of said slot and said root of said blade without any other mechanism configured to adjust said radial force.

21. The device for positioning a blade according to claim 1, wherein the spacer is hollow and free of material located between said top wall and said bottom wall so that said spacer freely flattens when radial forces are applied to said top wall and said bottom wall.

* * * * *

UNITED STATES PATENT AND TRADEMARK OFFICE
CERTIFICATE OF CORRECTION

| | | |
|---|---|---|
| PATENT NO. | : 7,334,996 B2 | Page 1 of 1 |
| APPLICATION NO. | : 11/340644 | |
| DATED | : February 26, 2008 | |
| INVENTOR(S) | : Claude Corbin et al. | |

It is certified that error appears in the above-identified patent and that said Letters Patent is hereby corrected as shown below:

In column 6, line 7, delete "the",
          line 13, after "positioning" insert --a--.

Signed and Sealed this

Twenty-sixth Day of August, 2008

JON W. DUDAS
*Director of the United States Patent and Trademark Office*